(12) United States Patent
Jamjoom et al.

(10) Patent No.: US 10,073,694 B2
(45) Date of Patent: Sep. 11, 2018

(54) DYNAMIC EXTENSIBILITY OF APPLICATION PROGRAMMING INTERFACES

(71) Applicant: International Business Machines Corporation, Armonk, NY (US)

(72) Inventors: Hani T. Jamjoom, Cos Cob, CT (US); Yew-Huey Liu, Yorktown Heights, NY (US); Daniel J. Williams, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/975,749

(22) Filed: Dec. 19, 2015

(65) Prior Publication Data

US 2016/0246592 A1  Aug. 25, 2016

Related U.S. Application Data

(60) Provisional application No. 62/118,537, filed on Feb. 20, 2015.

(51) Int. Cl.
*G06F 9/45* (2006.01)
*G06F 8/70* (2018.01)
(Continued)

(52) U.S. Cl.
CPC ............. *G06F 8/70* (2013.01); *G06F 8/36* (2013.01); *G06F 9/4425* (2013.01);
(Continued)

(58) Field of Classification Search
None
See application file for complete search history.

(56) References Cited

U.S. PATENT DOCUMENTS 8,898,658 B2 * 11/2014 Ciccone .................. G06F 9/445 717/168
2005/0138648 A1 * 6/2005 Ahmed ..................... G06F 9/54 719/328

(Continued)

FOREIGN PATENT DOCUMENTS

WO     2003093977 A1   11/2003
WO   WO2014204995 A1   12/2014

OTHER PUBLICATIONS

ShaikhAli, Ali, et al. "Uddie: An extended registry for web services." Applications and the Internet Workshops, 2003. Proceedings. 2003 Symposium on. IEEE, 2003.*

(Continued)

*Primary Examiner* — Matthew J Brophy
(74) *Attorney, Agent, or Firm* — Kurt Goudy; Otterstedt, Ellenbogen & Kammer, LLP

(57) ABSTRACT

A system for extending application programming interfaces provided by web service providers to interface with web services includes an application programming interface extender; a plurality of application programming interface extensions; and a catalog of the application programming interface extensions. The catalog logically links the application programming interface extensions with the application programming interfaces and provides an interface to first developers who upload the application programming interface extensions to the platform and second developers who develop applications which access the web services via the application programming interface extensions. The application programming interface extender receives requests to access given ones of the application programming interface extensions and routes at least some of the requests to the application programming interface extensions.

18 Claims, 10 Drawing Sheets

(51) Int. Cl.
  *G06F 9/54* (2006.01)
  *G06F 8/36* (2018.01)
  *G06F 9/44* (2018.01)
  *G06F 9/445* (2018.01)

(52) U.S. Cl.
  CPC .......... *G06F 9/44526* (2013.01); *G06F 9/541* (2013.01); *G06F 9/547* (2013.01)

(56) References Cited

U.S. PATENT DOCUMENTS

| | | | |
|---|---|---|---|
| 2005/0172281 A1* | 8/2005 | Goring | G06F 8/20 717/174 |
| 2005/0172282 A1 | 8/2005 | Shenfield et al. | |
| 2007/0156839 A1 | 7/2007 | Batra et al. | |
| 2007/0233580 A1* | 10/2007 | Pike | G06Q 30/0603 705/27.1 |
| 2009/0187573 A1* | 7/2009 | Johnston | G06F 8/10 |
| 2009/0199218 A1* | 8/2009 | Goring | G06F 8/61 719/328 |
| 2009/0276771 A1* | 11/2009 | Nickolov | G06F 9/4856 717/177 |
| 2011/0047535 A1* | 2/2011 | Polakam | G06F 9/542 717/168 |
| 2011/0321032 A1* | 12/2011 | Ciccone | G06F 8/65 717/171 |
| 2012/0124200 A1* | 5/2012 | Ramadass | H04L 63/1408 709/224 |
| 2012/0131591 A1* | 5/2012 | Moorthi | G06Q 10/06 718/104 |
| 2013/0103744 A1* | 4/2013 | Kim | G06F 9/54 709/203 |
| 2014/0366045 A1* | 12/2014 | West | G06F 9/54 719/328 |
| 2015/0007199 A1* | 1/2015 | Valeva | G06F 9/546 719/313 |

OTHER PUBLICATIONS

Application programming interface, downloaded from http://en.wikipedia.org/wiki/Application_programming_interface on Feb. 13, 2015. pp. 1-14.

Facebooker, downloaded from https://rubygems.org/gems/facebooker on Feb. 13, 2015. pp. 1-2.

Mobile & Telecom Research Blue Zen, Research, downloaded from http://researcher.watson.ibm.com/researcher/view_group_subpage.php?id=4998 on Feb. 13, 2015. pp. 1-4.

Representational state transfer, downloaded from http://en.wikipedia.org/wiki/Representational_state_transfer on Feb. 13, 2015. pp. 1-8.

Twilio, downloaded from http://en.wikipedia.org/wiki/Twilio on Feb. 13, 2015. pp. 1-4.

Web API, downloaded from http://en.wikipedia.org/wiki/Web_API on Feb. 13, 2015. pp. 1-2.

Web service, downloaded from http://en.wikipedia.org/wiki/Web_service on Feb. 13, 2015. pp. 1-5.

Domain Name System. Downloaded from http://en.wikipedia.org/wiki/Domain_Name_System on Feb. 19, 2015. pp. 1-17.

Peter Mel et al., The NIST Definition of Cloud Computing, NIST Special Publication 800-145, Sep. 2011, pp. 1-7.

International Application No. PCT/EP2016/052709, International Preliminary Report on Patentability Chapter I, dated Aug. 22, 2017, Authorized Officer Nora Lindner, pp. 1-7.

International Application No. PCT/EP2016/052709, International Search Report, dated May 2, 2016, Authorized Officer Nikolay Uhlmann, pp. 1-3.

International Application No. PCT/EP2016/052709, Written Opinion of the International Search Authority, dated Aug. 25, 2017, Authorized Officer Nikolay Uhlmann, pp. 1-6.

\* cited by examiner

SSE Extensible Catalog

SSE Extensible Catalog
An API catalog that allows new endpoints or *extensions* to be added to any API.

| | |
|---|---|
| Alpha ITS | Alpha ITS is an indoor triangulation system |
| Beta RFPRS | Beta RFPRS is a Recipe and Food Pairing Recommendation Service |
| Delta Weather Service | Delta Weather Service is a precision weather forecasting service |
| Gamma Maps | Gamma Maps image APIs make it easy to embed a static maps image into your web page |

*FIG. 5*

SSE Extensible Catalog

Delta Weather Service

Delta Weather Service is a precision weather forecasting service developed over the last decade. Using weather data and forecasts from NOAA and other sources, it provides weather predictions for regions and specified locations at a finer spatial and temporal granularity than other forecasting services that focus on weather-sensitive business decision-making. This has proved especially useful for utilities, agriculture, and other industries whose livelihood depends on accurate predictions of very local weather. Delta Weather Service runs on HPC clusters, and the results are made available to customers through some very nice static and dynamic visualizations (for the plots and interactive maps, use sp as both username and password)

| forecast | |
| --- | --- |
| sitemetadata | |

Get a Delta Weather Service forecast with specified parameters.

| Name | Description | Sample |
| --- | --- | --- |
| metrics | comma-separated list of desired metrics | temperature |
| site | name of site for which you want a forecast | YKT |
| forecastTime | time at which forecast was made (defaults to most recent if not specified) Format YYYYMMddhhmm | nil |

Test Endpoint

*FIG. 6*

```
● ○ ○    extensions — bash — 80 × 24 dhcp-9-2-60-182:extensions djwillia$ ./fc_push.bash weather_c/
Pushing to BlueMix...
Using manifest file manifest.yml Creating forecast-c...OK Updating forecast-c...OK
Uploading forecast-c...OK
Starting forecast-c...OK
Checking forecast-c...OK
Pushing to SSE Extensible Catalog...
{
    "name": "forecast-c",
    "desc": "Temperature forecast where temperature is always returned in degrees Celsius.",
    "snip": http://forecast-c.w3.bluemix.net/forecast-c?site=YKT",
    "params": [
        {
            "name": "site",
            "desc": "Site for temperature forecast.",
            "sample": "YKT"
        }
    ]
} dhcp-9-2-60-182:extensions djwillia$
```

FIG. 8

SSE Extensible Catalog

Delta Weather Service

Delta Weather Service is a precision weather forecasting service developed over the last decade. Using weather data and forecasts from NOAA and other sources, it provides weather predictions for regions and specified locations at a finer spatial and temporal granularity than other forecasting services that focus on weather-sensitive business decision-making. This has proved especially useful for utilities, agriculture, and other industries whose livelihood depends on accurate predictions of very local weather. Delta Weather Service runs on HPC clusters, and the results are made available to customers through some very nice static and dynamic visualizations (for the plots and interactive maps, use sp as both username and password)

forecast
sitemetadata
forecast-c

Temperature forecast where temperature is always returned in degrees Celsius.

| Name | Description | Sample |
|---|---|---|
| site | Site for temperature forecast. | YKT |

[ Test Endpoint ]

*FIG. 9*

DYNAMIC EXTENSIBILITY OF APPLICATION PROGRAMMING INTERFACES

CROSS-REFERENCE TO RELATED APPLICATIONS

This application claims the benefit of U.S. Provisional Application Ser. No. 62/118,537 filed 20 Feb. 2015, entitled DYNAMIC EXTENSIBILITY OF APPLICATION PROGRAMMING INTERFACES, the complete disclosure of which is expressly incorporated herein by reference in its entirety for all purposes.

STATEMENT OF GOVERNMENT RIGHTS

Not Applicable.

FIELD OF THE INVENTION

The present invention relates to the electrical, electronic and computer arts, and, more particularly, to computing services such as cloud computing services and the like.

BACKGROUND OF THE INVENTION

Currently, application programming interfaces (APIs) are controlled by service providers who expose APIs for their services. These APIs are slow to evolve (it is up to the service provider to decide whether to add a new feature or make a change), and typically do not suit any particular application ("app") developer's needs. Today, developers create client-side libraries which allow the developers to more easily consume the APIs (i.e., make the existing APIs more friendly to work with); however, these libraries may not be broadly shared, are often tied to one programming language, and are hard to find (e.g., not bundled with the API). This results in an inconsistent user experience. The library approach also suffers from an inconsistent and ad hoc approach to updates.

SUMMARY OF THE INVENTION

Principles of the invention provide techniques for dynamic extensibility of application programming interfaces.

In one aspect, an exemplary system for extending application programming interfaces provided by web service providers to interface with web services includes an application programming interface extender; a plurality of application programming interface extensions; and a catalog of the application programming interface extensions. The catalog logically links the application programming interface extensions with the application programming interfaces and provides an interface to first developers who upload the application programming interface extensions to the platform and second developers who develop applications which access the web services via the application programming interface extensions. The first and second developers are different entities than the web service providers. The application programming interface extender receives requests to access given ones of the application programming interface extensions, from the applications which access the web services via the application programming interface extensions, and routes at least some of the requests to the application programming interface extensions. Corresponding ones of the application programming interface extensions run alongside the applications which access the web services via the application programming interface extensions, to extend the application programming interfaces provided by the web service providers to interface with the web services.

In another aspect, an exemplary method for extending application programming interfaces provided by web service providers to interface with web services includes obtaining, from a plurality of first developers, a plurality of application programming interface extensions; and, via a catalog, offering the plurality of application programming interface extensions to a plurality of second developers who develop applications which access the web services via the application programming interface extensions. The first and second developers are different entities than the web service providers. Further steps include, via the catalog and an application programming interface extender, linking the application programming interface extensions with the application programming interfaces; receiving requests to access given ones of the application programming interface extensions, from the applications which access the web services via the application programming interface extensions; routing at least some of the requests to the application programming interface extensions; and running corresponding ones of the application programming interface extensions alongside the applications which access the web services via the application programming interface extensions, to extend the application programming interfaces provided by the web service providers to interface with the web services.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments reduce the amount of code that needs to be written by programmers and/or provide language-agnostic application programming interface extensions.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 5-10 show exemplary screen shots, according to embodiments of the present invention.

DETAILED DESCRIPTION OF PREFERRED EMBODIMENTS

Figure 1:
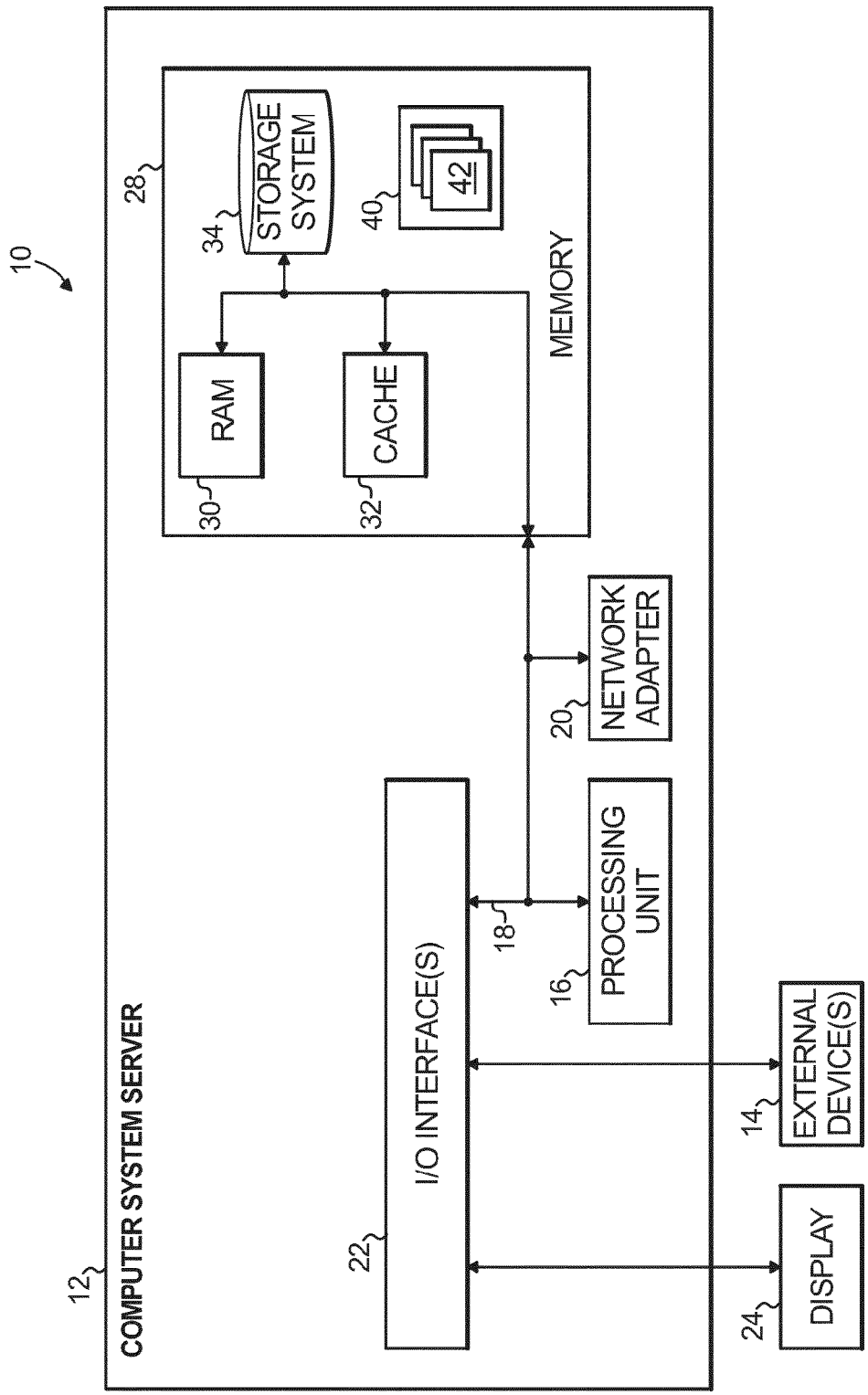
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
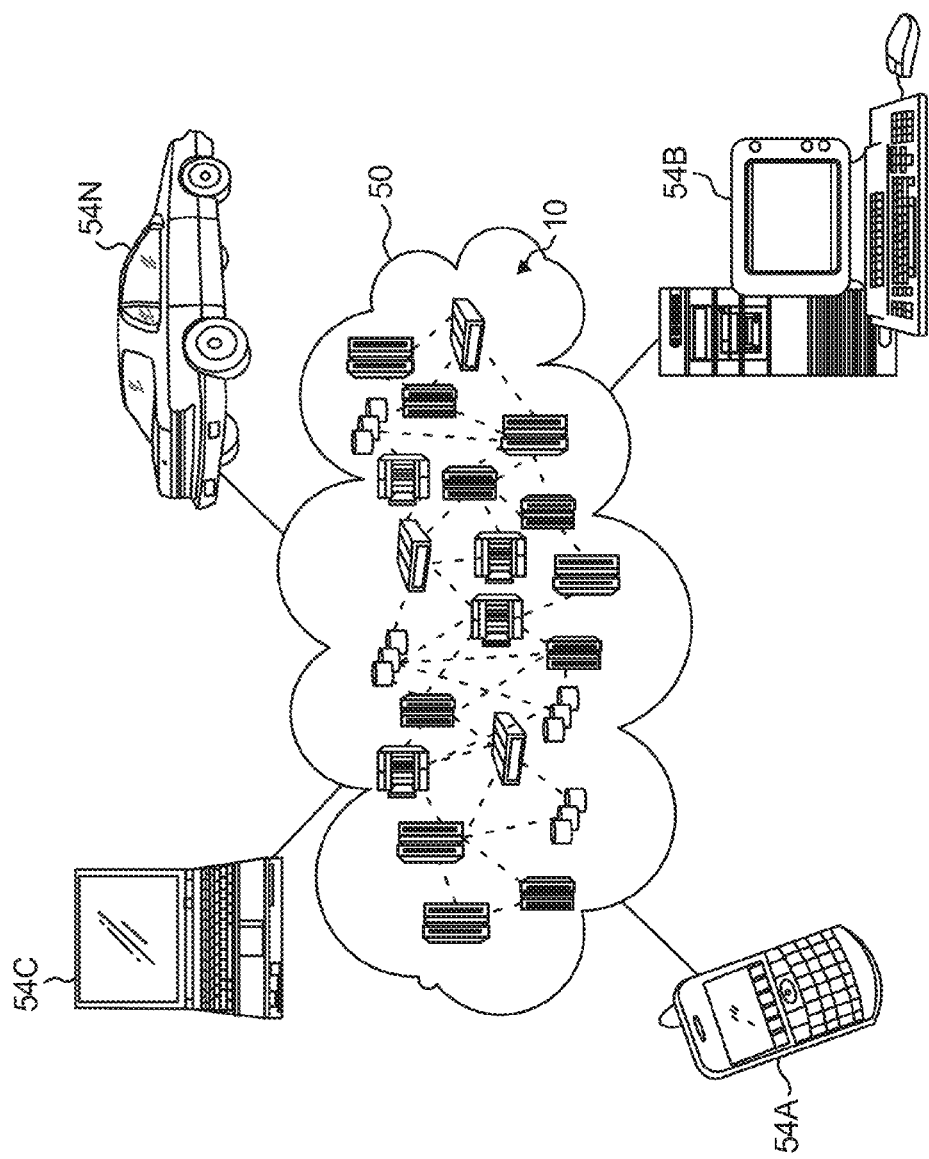
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
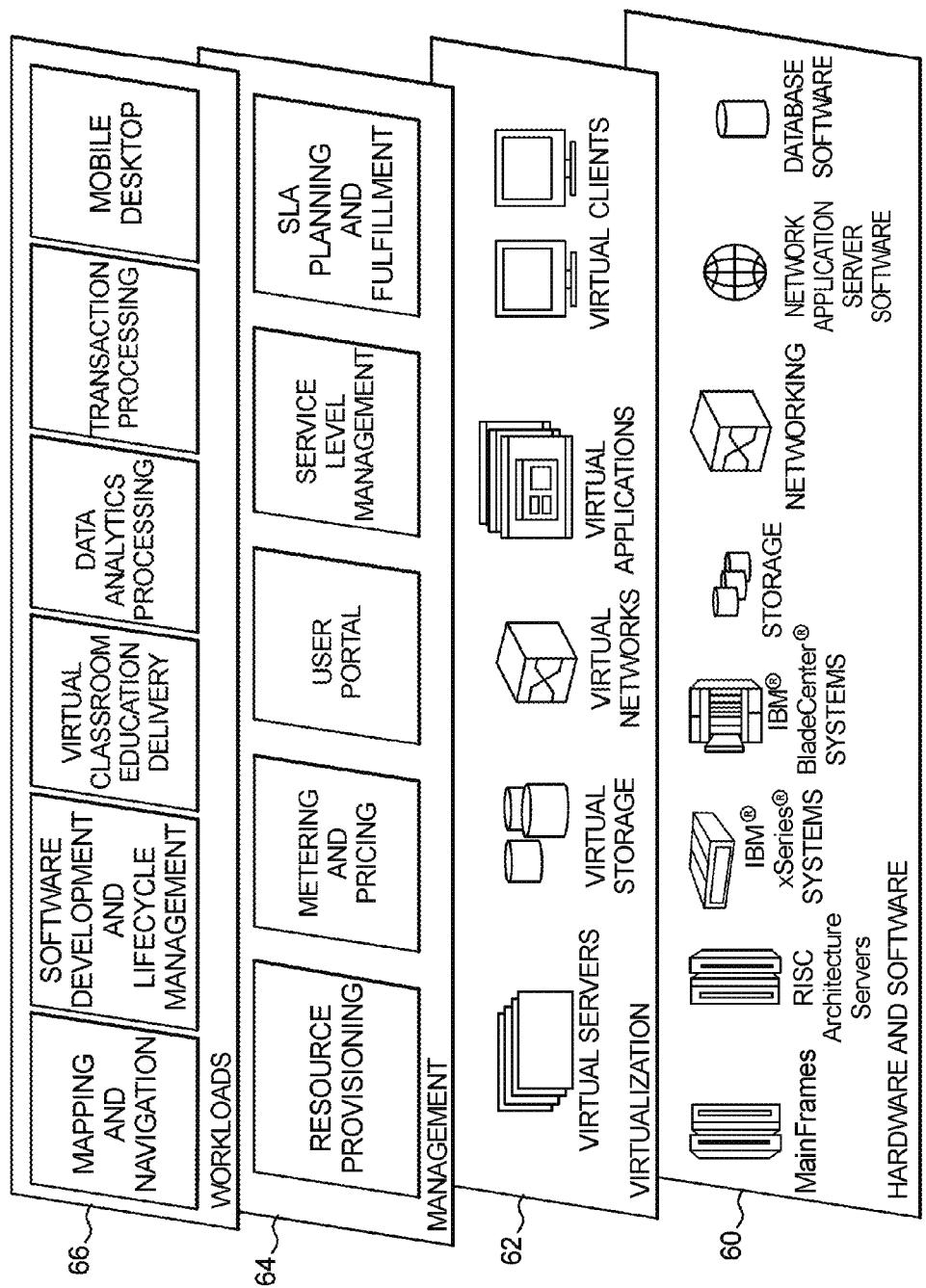
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted, currently, application programming interfaces (APIs) are controlled by service providers who expose APIs for their services. These APIs are slow to evolve (it is up to the service provider to decide whether to add a new feature or make a change), and typically do not suit any particular application ("app") developer's needs. Today, developers create client-side libraries which allow the developers to more easily consume the APIs (i.e., make the existing APIs more friendly to work with); however, these libraries may not be broadly shared, are often tied to one programming language, and are hard to find (e.g., not bundled with the API). This results in an inconsistent user experience. The library approach also suffers from an inconsistent and ad hoc approach to updates.

As compared to the prior-art library approach, one or more embodiments advantageously extend APIs without service provider involvement (i.e., without involvement of the service provider who provides the basic API to facilitate use of their service); achieve API extensions that provide a more compatible, consistent, and/or consumable API experience; and/or provide a platform and/or service to make the extension of APIs easier.

In one or more embodiments, a platform is provided to run "pluggable" API extensions in front of service APIs, and/or a catalog is provided to manage extensions and allow developers to select appropriate extensions.

Some exemplary extensions include:
  changing the format of the API response: for example, in a weather forecasting application, change the returned temperature to Celsius from Fahrenheit;
  enhancing performance: for example, caching static entries (wrap caches to look like API extensions to increase perceived speed of API);
  simplifying the API interface: for example, bundling many API calls into one; and/or
  combining APIs from different service providers: for example, mash-up, redundancy.

In one or more embodiments, endpoints can be overridden or new endpoints added. APIs can be thought of as objects having a plurality of method calls on them, which they implement. These are called endpoints; in one or more embodiments, they can be overridden by the API extensions. For example, a "get temperature" endpoint could be overridden with an API extension to return the temperature in Celsius rather than Fahrenheit, or a new endpoint could be provided, e.g., "get weather on map," which could be a mashup of a weather app and a map app (essentially adding a new method to the object).

Figure 4:
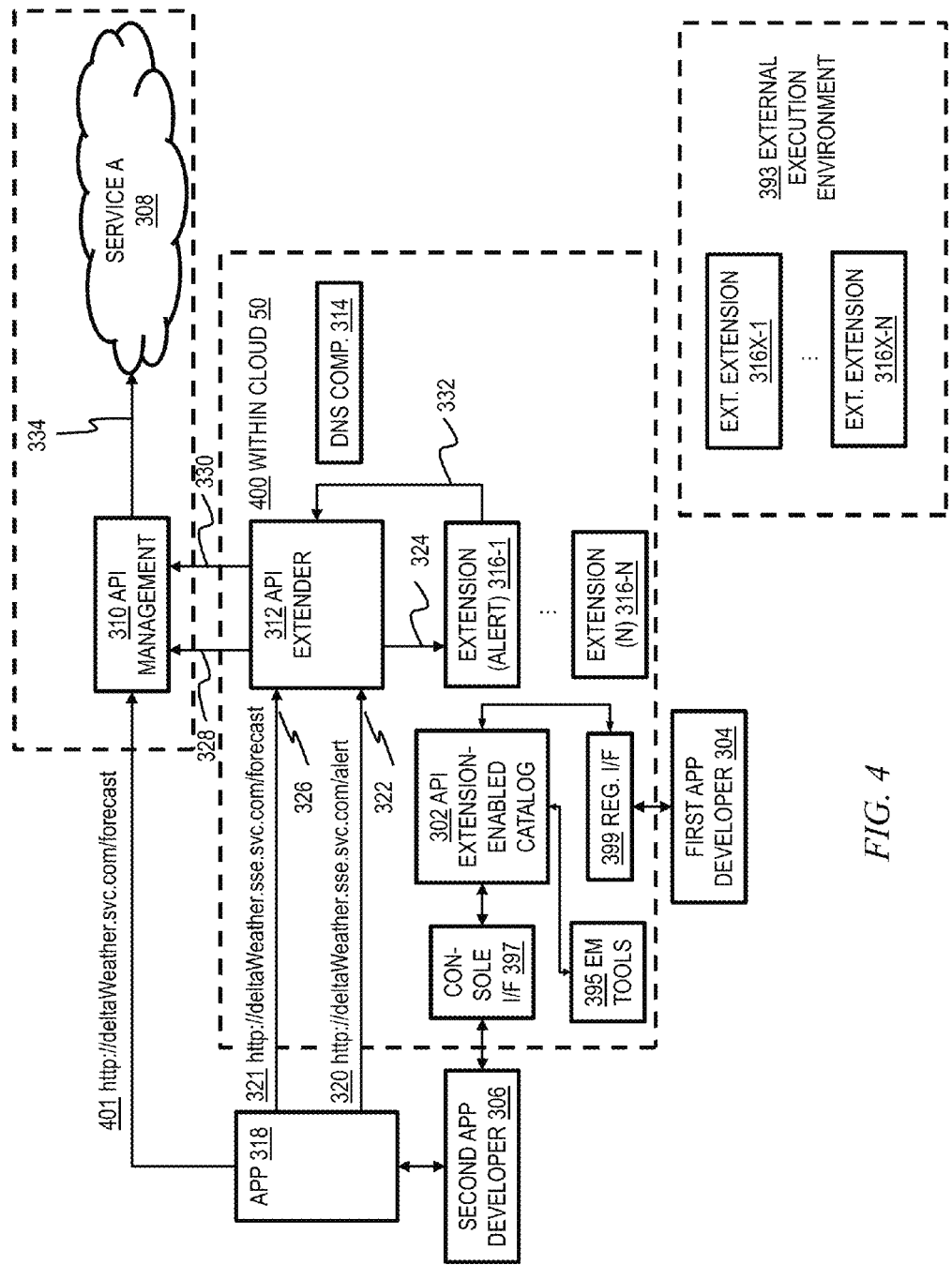
FIG. 4 depicts an exemplary software architecture and data flow diagram, according to an embodiment of the present invention.

Referring to FIG. 4, in one or more embodiments, a domain name server (DNS) component 314 interfaces with existing domain name system functionality to seamlessly map API endpoints to service or extension (in other embodiments, this mapping can be done manually without use of component 314). By controlling the DNS entries it is possible to make all the API endpoints, extended or not, appear to emanate from the same place (for example, via a prefix to platform 400). The DNS entries allow API extender 312 to route programmer queries to the correct extension.

A catalog 302 maintains a personalized view of selected extensions (each user may wish to override a given API in a different way; e.g., each user may want to return temperature in a different set of units).

Extension platform 400 monitors extensions for uptime, latency, ratings, and the like. In this regard, a user of Service A 308 via platform 400 now requires both service 308 and platform 400 to be "up" in order to have access. Note that element 400 is the extension platform and API extender 312 is the code that manages extensions and the process of how to route requests to the appropriate extensions. The extension platform 400 encompasses element 312 and in some embodiments is part of a Platform-as-a-Service cloud 50.

With continued reference to FIG. 4, in a non-limiting example, application 318 looks up the address of an endpoint via a DNS entry inserted by the platform (e.g., by DNS component 314) or manually. The DNS entry ensures that all requests from application 318 are routed to the extension platform 400, where the API extender 312 can decide to route the request to the alert extension 316-1 (or other extension in other cases) or to the service 308 via API management 310. "Service A" 308 is the service which exposes the baseline API (unextended API). Second app developer 306 utilizes catalog 302 to obtain the two URLs 320, 321. Furthermore in this regard, FIG. 4 depicts both development time and run time. In a first aspect of development time (extension development time), first developer 304 develops one or more API extensions and uploads them into the library 302 and platform 400. In a second aspect of development time (application development time), second developer 306 selects one or more extended APIs from library 302 for use with application 318. At run time, application 318 makes the requests for the URLs at 320, 321, and due to the aforementioned DNS entries, these are routed to API extender 312 which in turn routes them to the extension 316-1 or other extension or to the back end service 308.

So, at runtime, second app developer 306 has already written his or her application and has found a number of URLs 320, 321 which all appear to be prepended ("sse") and which all appear consistently (note that "sse" is a non-limiting example and the URLs can be prepended with something else in other embodiments). Second app developer 306 knows which are extended based on information on catalog 302. Requests 320, 321 appear to the application developer as normal requests. Forecast request 321 is routed to extender 312, as seen at 326. Extender 312 determines that request 321 is a native request (not extended) and simply needs to be forwarded to Service A 308. DNS component 314 forwards request 321 to API extender 312 which in turn forwards it to Service A 308 via API Management component 310 as seen at 328, 334. Forecast request 321 is a weather forecasting endpoint and is an original endpoint provided by service provider 308. On the other hand, alert request 320 is routed to extender 312, as seen at 322. The "alert" extended API may, for example, call the forecast function and look for bad weather conditions or special statements, and may return same. The "alert" extended API may further interface with a messaging service such as Twilio of San Francisco, Calif., USA or the like, to send out an alert when bad weather occurs or is predicted. Extender 312 determines that request 320 is for an extended API, and determines where the code for the extended API 320 is running on the platform 400 (in this case, at location 316-1) and how to invoke it. As indicated by arrows 324, 332, request 320 is eventually routed to service 308, as seen at 330, but first goes to the location of the extended API 316-1 for the "alert" extension.

Furthermore regarding requests 320, 321 and the concept of a native request (not extended) versus an extended request, note at 401 a request for the original API "http://deltaWeather dot svc dot com/forecast" directly from the app 318 to the service 308. This is a native request without any extension. Request 321 sent via platform 400 includes the pre-pended "sse" but is routed by platform 400 to service A without extension, as a native request. Request 320 sent via platform 400 includes the pre-pended "sse" and is for the non-native extended API "alert" and thus is routed by platform 400 to service A with extension, via alert code location 316-1, as a non-native request. Thus, in one or more embodiments, service 308 is "always there"—that is to say, in one or more embodiments, the base (un-extended) API is always exposed by the service provider and the extender 312 "knows," based on catalog 302, to simply route native requests to the existing service rather than to the extension(s). In such cases, execution is in the same location as the existing service.

In one or more embodiments, extension platform 400 with DNS component 314 and catalog 302 is implemented within a cloud 50, typically a PaaS cloud.

API management 310 is used by service provider 308 to assist in exposing one or more API endpoints. API management 310 manages aspects of the endpoint(s) including entitlement, throttling of requests, security, firewalling, and the like. The dotted line around elements 308 and 310 indicates that in one or more embodiments, API management 310 is clearly associated with service A 308 and is separate from platform 400.

Referring back to FIG. 3, in one or more non-limiting exemplary embodiments, elements of platform 400 can be located in workloads layer 66 or some or all of same can be located lower down in the stack (e.g. in management 64), especially for aspects such as routing requests.

One or more embodiments advantageously provide an integrated platform and catalog to support extensible APIs.

It is worth noting that some current techniques include a so-called API wrapper and/or API Extender approach which involves writing APIs to wrap APIs. This approach is language dependent and provider specific. One example includes the "Facebooker" Ruby wrapper on the Facebook REST API. Other current techniques employ a "create your own APIs" approach; examples include SalesForce dot com and Apex—this approach is limited to their data and does not allow integration with 3rd party APIs. (Note that to avoid including browser-executable code herein, "." within a URL is rendered as "dot" (space-dot-space) throughout.) Still other current techniques include caching for REST services, whether server-side or client-side. In this aspect, an individual gateway cache is needed for each service provider if fault-tolerance is desired.

One or more embodiments advantageously provide a platform 400 to run N "pluggable" API extensions such as 316-1, 316-N in front of service APIs (e.g., an API of service A 308). One or more embodiments advantageously provide a catalog 302 to manage extensions and allow developers (e.g., second developer 306) to select appropriate extensions. One or more embodiments advantageously provide a mechanism to monitor and rate extensions based on uptime, popularity, etc.; a catalog 302 to allow extensions to "bubble up" based on community ratings; and/or a catalog 302 that shows personalized views of extensions. Every embodiment of a catalog need not necessarily have all these features.

In one or more embodiments, an ecosystem can be constructed around platform 400. In one or more embodiments, the catalog of extensions and ability to extend APIs are explicitly exposed to developers and users.

It should be noted that extensions are services on their own and can, but need not, execute on platform 400. It is advantageous for them to do so, for monitoring and/or automatic resilience (spawning new instances), but is not a requirement. Extensions can alternatively run on another server (e.g., in another cloud) with the loss of some control and the ability to optimize routing. This is depicted in FIG. 4 as external API extensions 316X-1 through 316X-N in external execution environment 393. The figure shows "N" extensions in platform 400 and "N" external extensions but the number of extensions that execute on platform 400 need not be the same as the number of extensions that execute externally in environment 393.

In one or more embodiments, catalog 302 includes a database with data storage capability and includes endpoint definitions of the services that it is able to extend. This can be implemented, for example, in an API description language such as SWAGGER. The database also includes information about all the extensions and their locations. The database optionally also includes information about the developers and/or their apps; e.g., configuration of the endpoints so that routing can be properly carried out. Access can be provided by one or more interfaces; e.g., a normal web interface 397 (console interface) implemented with HTML and JAVA SCRIPT or the like. The interface(s) provide access to the catalog 302 (functioning, e.g., as a back-end service), which manages that database(s) just described. Interface 399 (registration interface) can be implemented, for example, as a Representational State Transfer (REST) interface for programmatic uploading (although a user-facing web interface with HTML and JAVA SCRIPT or the like could also be provided). Furthermore, interface 397 could also include a REST interface for programmatic communication in some instances. REST interfaces could be accessed by a command line tool, for example. REST is a non-limiting example of a programmatic interface.

In one or more embodiments, API extender 312 is a web service which listens for network requests and checks the state via the catalog 302 (e.g., database of the catalog) to determine what user had made the request and where the request should be routed to—in essence, a web service that implements redirection. API extender 312 can be written, for example, with logic in RUBY and with a front end in JAVA SCRIPT, Cascading Style Sheets (CSS), and HTML. However, any language, low- or high-level, can be used. The extensions themselves (316 generally) can be written in any desired language; RUBY and Node.js® (registered mark of Joyent, Inc., San Francisco, Calif., USA)(JAVA SCRIPT that runs off a server) are non-limiting examples. The application(s) 318 can be written in any desired language; web services are likely to use a higher level language like RUBY, Node.js®, PHP, or PYTHON, but a low-level language like C could also be used.

FIG. 5 shows an exemplary screen shot of a user interface that catalog 302 will present to first app developer 304, who develops API extensions and archives same in catalog 302, and/or to second app developer 306, who develops an application that wishes to make use of an API extension such as 316. In this case, the APIs for which API extensions can be developed include ALPHA Indoor Triangulation System, BETA Recipe and Food Pairing Recommendation Service, Delta Weather Service, and GAMMA Maps.

FIG. 6 shows a screen displayed when the user selects "Delta Weather Service" in FIG. 5. The APIs for Delta Weather Service are "forecast" and "sitemetadata." The parameters associated with the "forecast" API include "metrics," "site," and "forecastTime."

Figure 7:
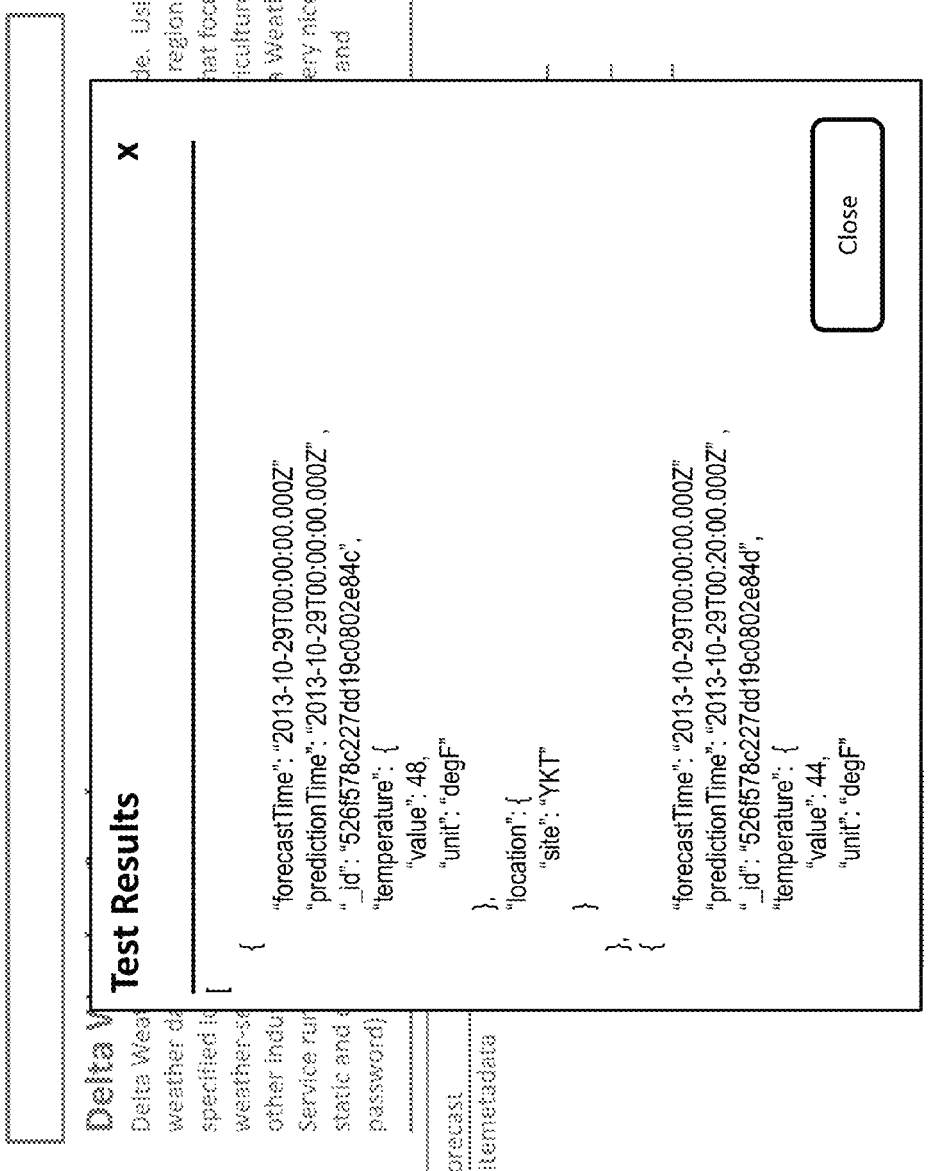

FIG. 7 shows a screen displayed when the user selects the "Test Endpoint" button in FIG. 6. The desired metric is predicted temperature at a site (YKT) in Yorktown Heights, N.Y., USA. The value of 44 degrees Fahrenheit is returned.

Figure 10:
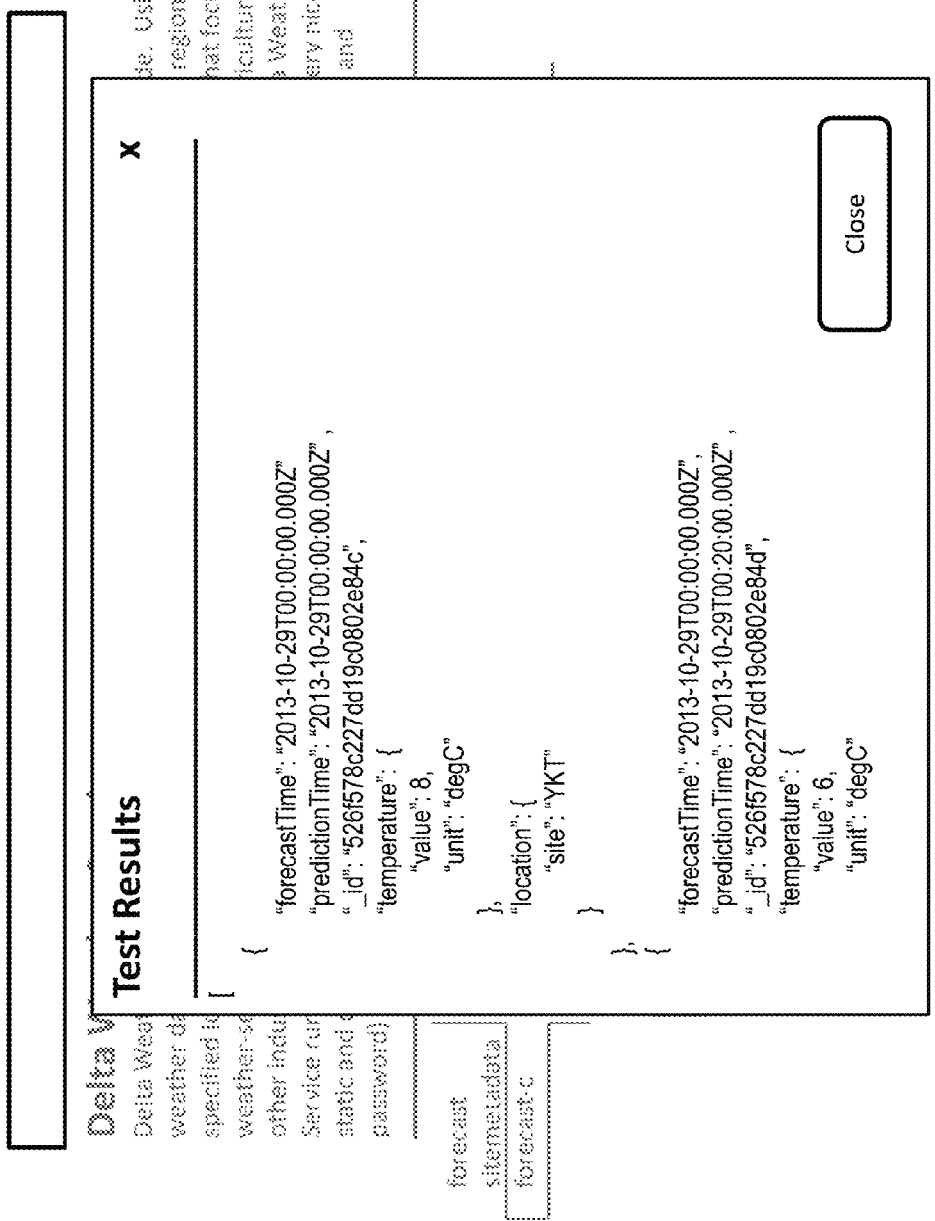

FIG. 8 shows an extended API to return the temperature in Celsius instead of Fahrenheit. FIG. 9 shows this extended API added to the list of available APIs as "forecast-c." FIG. 10 shows a screen displayed when the user selects the "Test Endpoint" button in FIG. 9 with "forecast-c" selected (instead of "forecast" as in FIG. 6). The desired metric is predicted temperature at the Yorktown (YKT) site, in Celsius. The value of 6 degrees Celsius is returned.

By way of review and provision of additional detail, the existing "language-level" approach is not portable across languages; libraries are difficult to share broadly and/or to extend, for this reason; libraries are hard to find (not always bundled with API, esp. third party); and libraries are invoked through various language-dependent methods, providing an inconsistent user experience.

One or more embodiments present a platform 400 where a developer 304 can register his or her API extension and deploy his or her extension to the cloud 50. Once the extension is registered and deployed, a consumer (e.g., second app developer 306) can view the definition, and can use the extension as well as the original API definition in the same catalog 302 in a seamless manor. In one or more embodiments, platform 400 also monitors and maintains the availability of the deployed extension by dynamically instantiating an additional instance. To use the extension, the user (e.g., second app developer 306) can either connect with platform 400, or can download the extension component where it can direct the original API(s) to its/their providers and redirect the extension to platform 400 for the extension functionalities.

In one or more embodiments, the dynamically extensible APIs platform 400 provides an easy-to-use interface for service providers (e.g., provider of "Service A" 308) to register their API(s). It also provides the same interface for developers interested in providing their extension(s) to register as extension(s) of the original APIs. Once registered, platform 400 provides a DNS entry or the DNS updates are made manually. For example, the original API's base URL is apis dot companyA dot com and a new DNS entry is created as apis dot companyA dot sse dot ibm dot com. In a non-limiting example, with two endpoints, consider CheckWeather (original API from services provider) and CheckWeather-zipcode (API extension, using ZipCode instead of City name). The user uses apis dot companyA dot sse dot ibm dot com/CheckWeather?City=YorkTown and apis dot companyA dot sse dot ibm dot com/CheckWeather-zipcode?ZipCode=10598 to access the resources. Both Rest APIs will contact platform 400 before going out to the services provider. The user can also download the extender from platform 400, where it controls the translation of the original API base URL from (apis dot companyA dot sse dot ibm dot com) to (apis dot companyA dot com), thus bypassing the requirement of passing through platform 400 when using the original APIs from the service provider. Upon receiving the extension request from the user, platform 400 will pass the API request to the corresponding extension instance 316 running on a cloud 50. If the instance is unavailable or overloaded, platform 400 will dynamically instantiate a new or additional one to handle the request.

Thus, one or more embodiments provide a computer system including one or more computer programs referred to as "API extensions," written in any language, which call one or more API endpoints and expose an API interface of their own. The system further includes one or more computer programs called "applications" 318 which are developed by a developer (e.g., 306); a platform-as-a-service cloud platform 400 that executes API extensions; a catalog 302 that displays and groups a dynamic set of API extensions on a sub-API (e.g., API endpoint) granularity; a registration interface 399 on the platform-as-a-service cloud platform; a console interface 397 on the platform-as-a-service cloud platform; and a set of extension-monitoring tools 395 on the platform-as-a-service cloud platform. Registration interface 399 provides a user interface for first application developer(s) 304 to register API extensions with platform 400 (and in particular, with catalog 302 thereof). Console interface 397 provides a user interface for second application developer(s) 306 to interface with platform 400 (and in particular, with catalog 302 thereof). Note that in one or more embodiments, the endpoints and API descriptions are no longer static because third parties (first app developer(s) 304) are upgrading and changing the extensions. The set of extension-monitoring tools 395 monitor these upgrades and changes to help the second app developer(s) 306 determine which endpoints and/or extensions to use. Alternatively or additionally, the set of extension-monitoring tools 395 monitor the state (i.e., percentage "up" or "down") of the API extensions. The second app developer(s) 306 access the set of extension-monitoring tools 395 via, for example, the console interface 397.

By way of clarification and provision of additional detail, in one or more embodiments:

first developer 304 uploads extensions through registration interface 399, intended to augment an API 308 or override some endpoints;

catalog 302 maintains a data structure representing APIs (e.g., 308) and all extensions uploaded through the registration interface 399;

extension monitoring tools 395 monitor the state (e.g., percentage of time up/down) of extensions to provide additional information that the catalog 302 stores as metadata about extensions;

second developer 306 learns about APIs, extensions and associated metadata (e.g., computed by extension monitoring tools 395) through console interface 397 and writes code to invoke them in his or her app 318.

In some embodiments, the registration interface enables the uploading of "API extensions" into the platform 400.

In some embodiments, the console interface enables the developer 306 to enable and/or disable "API extensions" for an application running on the platform-as-a-service cloud.

In some embodiments, the platform 400 executing in the cloud interprets and remaps DNS entries to API extensions.

In some embodiments, the platform-as-a-service cloud platform 400 routes traffic from applications through "API extensions."

In some embodiments, the platform-as-a-service cloud platform 400 monitors request latency through "API extensions."

In some embodiments, the platform-as-a-service cloud platform 400 monitors "API extensions" uptime.

In some embodiments, the platform-as-a-service cloud platform 400 transfers "API extensions" information to the catalog 302.

In some embodiments, the catalog 302 inputs community ratings on an endpoint granularity.

In some embodiments, the catalog 302 displays community ratings (at endpoint granularity) in a "bubble up" popularity fashion. Furthermore in this regard, unlike standard API catalogs, endpoints in the extension-enabled catalog may be extended, overridden, and/or enhanced by multiple parties. This allows the use of metrics to sort extensions in the catalog. One such metric is a "rating" by the community; it is common in news aggregators to maintain a sort order based on ratings by "bubbling up" highly rated or newly added stories. A similar concept can be applied to extensions. In one or more embodiments, the second app developer(s) 306 access ratings in catalog 302 via, for example, the console interface 397.

In some embodiments, the catalog 302 displays endpoint monitoring information (at endpoint granularity).

In some embodiments, the catalog 302 displays enables the developer 306 to select which endpoints (and extensions) include an API for a particular application and therefore materializes a personalized view.

One or more embodiments provide a system and associated software components to allow Web service APIs (e.g., REST) to be extended by third parties (e.g., first developer 304) and discovered and/or consumed by an application developer (e.g., second developer 306) just like existing service APIs. One or more embodiments include three novel software components, namely, an "API extension" 316; an "API extension platform" 400 that runs API extensions alongside applications and offers a control interface for developers; and an "API extension-enabled catalog" 302 that links API extensions with endpoints and offers a dynamic view of the API ecosystem to developers.

The "API extensions" 316 are computer programs, written in any computer language, that perform some task to simplify the developer's task. Extensions can include (but are not limited to) things such as parameter/response format modification, performance enhancement, API simplification, API mash-up, etc. The most similar software concept in the current state of the art is the concept of "libraries," which are typically tied to a single programming language, may not be broadly shared, are difficult to find (are not bundled with APIs), and which offer an inconsistent developer experience.

The "API extension platform" 400 is a computer system that executes the computer programs referred to as "API extensions." The most similar software concept in the current state of the art is a "platform as a service (PaaS) cloud," in which a computer program is executed in a data center by (possibly) third-party cloud software that provides the execution environment and additional services including monitoring, etc. However, while PaaS is for general applications, the API extension platform 400, in one or more embodiments, augments the PaaS with features that are specific to extensions, including, one or more of DNS remapping for seamless consumption; traffic routing between general applications running on the PaaS, API extensions, and API endpoints; a registration interface for new extensions to be incorporated into the extension ecosystem; a console with which PaaS users can specify and control the association between general applications running on the PaaS and the extensions they traverse; specialized and consistent monitoring for extension latency (how long the extension runs per request), extension uptime (how often the extension fails), etc.; and/or integration with the "API extension-enabled catalog" to integrate new and/or updated endpoints and consistent monitoring information.

The "API extension-enabled catalog" 302 is a computer system that integrates with the API extension platform 400 to maintain and display a dynamic set of API endpoints overlaying static API service endpoints for developer consumption. Current state-of-the-art API catalogs are static in the sense that API service endpoint catalog pages are only updated when the API service changes and are under the control of the service provider, and APIs can be rated and/or compared only on a full API granularity. On the other hand, in one or more embodiments, the API service catalog pages in the "API extension-enabled catalog" 302 are dynamic in that they contain per-endpoint information about relevant extensions. Thus, the "API extension-enabled catalog" 302 can be rated and/or compared at a sub-API granularity (e.g., per endpoint). In one or more embodiments, the catalog 302 has any one, some, or all of the following distinguishing features: community ratings for extensions (on an endpoint granularity) and a display to "bubble up" highly rated extensions; consistent monitoring information from the "API extension platform" allows API endpoints to be compared fairly both across providers (API granularity) and extensions (endpoint granularity); view management to show personalized materialization of APIs (which endpoints include an API). In one or more embodiments, the catalog 302 provides an interface to the platform 400, which helps the developer learn what is in the platform and how to indicate to the platform what extensions (i.e., extended APIs) should be used at runtime. Furthermore in this regard, in one or more embodiments, the catalog 302 allows the second app developer(s) 306 to indicate to the platform which extensions the developer wants to activate for the particular endpoint—the second app developer uses the catalog as a portal to indicate to the platform to how to route—e.g., "forecast" endpoint should go through an endpoint rather than directly. The second app developer specifies how "forecast" should work; i.e., in general, how an API should be consumed (what set of endpoints and endpoint extensions make up the API).

One or more embodiments, rather than addressing the design of special-purpose API, provide a system that manages and runs API extensions for any API. In other words, one or more embodiments do not provide a new service with a new API but rather a new system that affects how existing (and future) APIs are consumed.

Furthermore, one or more embodiments provide API extensions that are not constrained to run directly on the "agent network device" (e.g., the server) where the API is implemented. On the contrary, in one or more embodiments:

the API extensions run in a PaaS cloud on different machine(s) than the machine where the API is implemented, the API extensions are implemented by a third party unbeknownst to the API provider, and the API extensions do not modify the existing API providers in any way.

Furthermore, one or more embodiments provide an ecosystem or catalog of extensions, provide for consideration and management of dynamic per-user extensions, and provide a system that monitors dynamic per-user extensions.

In one or more embodiments, the term API refers to a "Web API," or the interface between an application and a Web service running across the network. The opportunities for interposition for extension are significant for interactions over a network, as compared to other cases.

Recapitulation

Given the discussion thus far, it will be appreciated that an exemplary system (e.g., some or all of platform 400) for extending application programming interfaces provided by web service providers to interface with web services, according to an aspect of the invention, includes an application programming interface extender 312, a plurality of application programming interface extensions 316, and a catalog of the application programming interface extensions 302. The catalog logically links the application programming interface extensions with the application programming interfaces and provides an interface to first developers who upload the application programming interface extensions to the platform and second developers who develop applications which access the web services via the application programming interface extensions. The first and second developers are different entities than the web service providers. For a given service, the first and second developers are different than the service provider; this does not imply that an entity that is a service provider could not use the platform to extend someone else's APIs in a different case.

The application programming interface extender receives requests to access given ones of the application programming interface extensions, from the applications which access the web services via the application programming interface extensions, and routes at least some of the requests to the application programming interface extensions. Corresponding ones of the application programming interface extensions run alongside the applications which access the web services via the application programming interface extensions, to extend the application programming interfaces provided by the web service providers to interface with the web services.

In some cases, the corresponding ones of the application programming interface extensions run alongside the applications which access the web services on a platform 400 including the application programming interface extender and the catalog.

Alternatively or in addition, in some cases, corresponding ones of the application programming interface extensions run alongside the applications which access the web services in an environment 393 separate from a platform 400 including the application programming interface extender and the catalog.

In one or more embodiments, the application programming interface extensions do not modify existing operations of the web service providers in any way. That is to say, the web service providers do not change their services and need not even be aware of the extensions. One or more embodiments provide a layer on top of the existing APIs rather than modifications of existing APIs.

In some cases, the application programming interface extensions run in a platform as a service cloud computing environment on one or more cloud computing nodes which are separate and distinct from computers on which the web service providers provide the web services.

Some embodiments further include a domain name system component 314 that accesses an external domain name system to point the requests to the application programming interface extender. In some cases, component 314 is logically part of extender 312.

The system components can be implemented, for example, by corresponding distinct software modules on a non-transitory computer-readable storage medium, loaded into memory, which configure one or more processors (e.g., in the PaaS cloud).

Furthermore, given the discussion thus far, it will be appreciated that in another aspect, an exemplary method for extending application programming interfaces provided by web service providers to interface with web services, includes obtaining, from a plurality of first developers 304, a plurality of application programming interface extensions 316; and, via a catalog 302, offering the plurality of application programming interface extensions to a plurality of second developers 306 who develop applications which access the web services via the application programming interface extensions. The first and second developers are different entities than the web service providers. A further step includes, via the catalog and an application programming interface extender, linking the application programming interface extensions with the application programming interfaces. In this regard, the API extender does this based on information in catalog 302. The catalog 302 is where the second app developer 306 communicates his or her intent to override various endpoints in various ways with different extensions—the information input to the catalog is used by the API extender to determine out how to map. When the first app developer uploads the extensions, they are linked in the database between the extension being uploaded and the API it is extending—a logical dependency. So, that is a link in terms of a database entry. Later, when the second app developer operates, a different type of link occurs—the second app developer decides to actuate a given extension—this is a different type of link, an active link/routing rule.

Further steps include receiving requests (e.g., 320) to access given ones of the application programming interface extensions, from the applications 318 which access the web services via the application programming interface extensions; and routing at least some of the requests to the application programming interface extensions (i.e., to extensions 316 rather than the native service). An even further step includes running corresponding ones of the application programming interface extensions alongside the applications which access the web services via the application programming interface extensions, to extend the application programming interfaces provided by the web service providers to interface with the web services.

In some instances, the corresponding ones of the application programming interface extensions run alongside the applications which access the web services on a platform 400 including the application programming interface extender and the catalog. Alternatively or additionally, in some cases, corresponding ones of the application programming interface extensions may run alongside the applications which access the web services in an environment 393 separate from platform 400 including the application programming interface extender and the catalog. In either case, the extensions do not run where service A per se runs.

In some instances, a further step includes the application programming interface extensions not modifying existing operations of the web service providers in any way.

In some instances, the running of the application programming interface extensions includes running application programming interface extensions in a platform as a service cloud computing environment 50 on one or more cloud computing nodes which are separate and distinct from computers on which the web service providers provide the web services (platform 400 can be on a cloud 50 and/or external environment 393 can be on a separate cloud).

In some cases, a further step includes accessing an external domain name system (e.g., manually or via component 314) to point the requests to the application programming interface extender.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments are particularly significant in the context of a cloud or virtual machine environment, although this is exemplary and non-limiting. Reference is made back to FIGS. 1-3 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks making up platform 400 in FIG. 4.

In one or more embodiments the platform includes the following, implemented as distinct software modules and/or sub-modules:

API extender 312
  a plurality of API extensions 316-1 through 316-N stored and executed on platform 400 (and/or externally in separate environment 393—see extensions 316X-1 through 316-XN) and accessed via a catalog 302
  API extension-enabled catalog 302 that links API extensions with endpoints and offers a dynamic view of the API ecosystem to developers
  DNS component 314 which interfaces with external DNS to set the pointers
  registration interface 399
  console interface 397
  extension-monitoring tools 395.

The API extension platform 400 runs the API extensions alongside applications and offers a control interface for developers; in an alternative embodiment, the extensions are in a separate location 393 (e.g. a separate cloud).

The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface to implement user interface aspects of catalog 302 (e.g., interfaces with developers 304, 306) is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for extending application programming interfaces provided by web service providers to interface with web services, said system comprising:
a processor programmed to implement:
a plurality of application programming interface extensions having a plurality of Uniform Resource Locators (URLs) with a plurality of different domain names; an application programming interface extender that manages and routes requests to said application programming interface extensions; an extension platform, which has a single domain name and includes said application programming interface extender, that monitors said application programming interface extensions for uptime, latency, and ratings; a domain name server component that maps said different domain names of said application programming interface extensions to said single domain name of said extension platform and receives requests to access given ones of said application programming interface extensions; and a catalog, which is included in said extension platform, that associates said application programming interface extensions with said single domain name of said extension platform; wherein: said catalog logically links said application programming interface extensions with said application programming interfaces; said catalog provides an interface to first developers who upload said application programming interface extensions to said platform and second developers who develop applications which access said web services via said application programming interface extensions, said first and second developers being different entities than said web service providers; said application programming interface extender receives said requests to access given ones of said application programming interface extensions, routed by said domain name server, from said applications which access said web services via said application programming interface extensions, and routes at least some of said requests to said application programming interface extensions; and corresponding ones of said application programming interface extensions run alongside said applications which access said web services via said application programming interface extensions, to extend said application programming interfaces provided by said web service providers to interface with said web services.

2. The system of claim 1, wherein said application programming interface extensions do not modify existing operations of said web service providers in any way.

3. The system of claim 1, wherein said application programming interface extensions run in a platform as a service cloud computing environment on one or more cloud computing nodes which are separate and distinct from computers on which said web service providers provide said web services.

4. The system of claim 1, wherein said corresponding ones of said application programming interface extensions run alongside said applications which access said web services on said extension platform.

5. The system of claim 1, wherein said corresponding ones of said application programming interface extensions run alongside said applications which access said web services in an environment separate from said extension platform.

6. The system of claim 1, further comprising a domain name system component interfacing with said domain name server, wherein said domain name system accesses an external domain name system to point said requests to said application programming interface extender.

7. A method for extending application programming interfaces provided by web service providers to interface with web services, said method comprising: obtaining, from a plurality of first developers, a plurality of application programming interface extensions having a plurality of Uniform Resource Locators (URLs) with a plurality of different domain names; via a catalog, offering said plurality of application programming interface extensions under a single domain name to a plurality of second developers who develop applications which access said web services via said application programming interface extensions, said first and second developers being different entities than said web service providers; via an extension platform, which includes said catalog and an application programming interface extender and which has said single domain name, monitoring said application programming interface extensions for uptime, latency, and ratings; via said catalog and said application programming interface extender, linking said application programming interface extensions with said application programming interfaces; via a domain name server component, mapping said plurality of different domain names of said application programming interface extensions to said single domain name of said extension platform; receiving requests to access given ones of said application programming interface extensions, from said applications which access said web services via said application programming interface extensions; routing at least some of said requests to said application programming interface extensions via said domain name server component; and running corresponding ones of said application programming interface extensions alongside said applications which access said web services via said application programming interface extensions, to extend said application programming interfaces provided by said web service providers to interface with said web services.

8. The method of claim 7, further comprising said application programming interface extensions not modifying existing operations of said web service providers in any way.

9. The method of claim 7, wherein said running of said application programming interface extensions comprises running application programming interface extensions in a platform as a service cloud computing environment on one or more cloud computing nodes which are separate and distinct from computers on which said web service providers provide said web services.

10. The method of claim 7, wherein said corresponding ones of said application programming interface extensions run alongside said applications which access said web services on said extension platform.

11. The method of claim 7, wherein said corresponding ones of said application programming interface extensions run alongside said applications which access said web services in an environment separate from said extension platform.

12. The method of claim 7, further comprising accessing an external domain name system to point said requests to said application programming interface extender.

13. A non-transitory computer readable medium comprising computer executable instructions which when executed by a computer cause the computer to perform a method for extending application programming interfaces provided by web service providers to interface with web services, said method comprising: obtaining, from a plurality of first developers, a plurality of application programming interface extensions having a plurality of Uniform Resource Locators (URLs) with a plurality of different domain names; via a catalog, offering said plurality of application programming interface extensions under a single domain name to a plurality of second developers who develop applications which access said web services via said application programming interface extensions, said first and second developers being different entities than said web service providers; via said catalog and an application programming interface extender, linking said application programming interface extensions with said application programming interfaces; via an extension platform having said single domain name and including said application programming interface extender and said catalog, monitoring said application programming interface extensions for uptime, latency, and ratings; via a domain name server component, mapping said plurality of domain names of said application programming interface extensions to said single domain name of said extension platform; receiving requests to access given ones of said application programming interface extensions, from said applications which access said web services via said application programming interface extensions; routing at least some of said requests to said application programming interface extensions via said domain name server component; and running corresponding ones of said application programming interface extensions alongside said applications which access said web services via said application programming interface extensions, to extend said application programming interfaces provided by said web service providers to interface with said web services.

14. The non-transitory computer readable medium of claim 13, wherein said method further comprises said application programming interface extensions not modifying existing operations of said web service providers in any way.

15. The non-transitory computer readable medium of claim 13, wherein said running of said application programming interface extensions comprises running application programming interface extensions in a platform as a service cloud computing environment on one or more cloud computing nodes which are separate and distinct from computers on which said web service providers provide said web services.

16. The non-transitory computer readable medium of claim 13, wherein said corresponding ones of said application programming interface extensions run alongside said applications which access said web services on said extension platform.

17. The non-transitory computer readable medium of claim 13, wherein said corresponding ones of said application programming interface extensions run alongside said applications which access said web services in an environment separate from said extension platform.

18. The non-transitory computer readable medium of claim 13, wherein said method further comprises accessing an external domain name system to point said requests to said application programming interface extender.

* * * * *